United States Patent
Wang

(10) Patent No.: US 11,399,052 B2
(45) Date of Patent: Jul. 26, 2022

(54) TIMESTAMP PROCESSING METHODS FOR STREAMING MEDIA

(71) Applicant: REALTEK SEMICONDUCTOR CORPORATION, Hsinchu (TW)

(72) Inventor: Jie Wang, Suzhou (CN)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/498,772

(22) Filed: Oct. 12, 2021

(65) Prior Publication Data
US 2022/0124134 A1   Apr. 21, 2022

(30) Foreign Application Priority Data
Oct. 15, 2020  (CN) .......................... 202011102838.3

(51) Int. Cl.
G06F 15/16   (2006.01)
H04L 65/60   (2022.01)
H04L 65/61   (2022.01)

(52) U.S. Cl.
CPC ........ H04L 65/601 (2013.01); H04L 65/4069 (2013.01)

(58) Field of Classification Search
CPC .......................... H04L 65/601; H04L 65/4069
See application file for complete search history.

(56) References Cited

U.S. PATENT DOCUMENTS

| 9,674,562 | B1* | 6/2017 | Spracklen | H04N 21/233 |
| 10,158,927 | B1* | 12/2018 | Lei | H04N 21/233 |
| 2012/0066711 | A1* | 3/2012 | Evans | H04S 3/008 |
| | | | | 725/32 |

(Continued)

FOREIGN PATENT DOCUMENTS

| CN | 103731716 A | 4/2014 |
| CN | 106507217 A | 3/2017 |

OTHER PUBLICATIONS

OA letter of the counterpart TW application (appl No. 109136670) mailed on Nov. 10, 2021. Summary of the OA letter: Claims 1-5 and 7-9 are rejected under Patent Law Article 22(2) as being unpatentable over reference 1 (CN 103731716A) and reference 2 (CN 106507217A). Claims 1-10 in TW counterpart application correspond to claims 1-10 in US application, respectively.

*Primary Examiner* — Oleg Survillo
(74) *Attorney, Agent, or Firm* — WPAT, PC

(57) ABSTRACT

A timestamp processing method for streaming media is provided to generate a current output video timestamp and a current output audio timestamp. The method includes the steps of: extracting multiple video data and multiple audio data from a multimedia data; processing the video data to obtain multiple video timestamps; processing the audio data to obtain multiple audio timestamps; initializing a start timestamp; calculating a first characteristic value and a second characteristic value based on multiple target timestamps, which are the video timestamps or the audio timestamps; and updating the start timestamp and using the start timestamp as the current output video timestamp or the current output audio timestamp when the absolute difference between the first characteristic value and the second characteristic value is greater than a threshold value.

18 Claims, 6 Drawing Sheets

(56) References Cited

U.S. PATENT DOCUMENTS

| | | | | |
|---|---|---|---|---|
| 2012/0304236 A1* | 11/2012 | Qiu | .................... | H04N 21/4384 |
| | | | | 725/109 |
| 2014/0173467 A1* | 6/2014 | Clavel | ................ | H04L 12/1822 |
| | | | | 715/758 |
| 2015/0341528 A1* | 11/2015 | Ren | .................... | H04N 21/6125 |
| | | | | 348/515 |
| 2017/0150141 A1* | 5/2017 | Yang | .................... | H04N 17/004 |
| 2018/0115799 A1* | 4/2018 | Thiele | ................ | G11B 27/3045 |
| 2018/0205986 A1* | 7/2018 | Cao | ........................ | H04N 21/43 |
| 2020/0258545 A1* | 8/2020 | Huang | ................ | G11B 27/002 |
| 2021/0021889 A1* | 1/2021 | Yu | .................... | H04N 21/43072 |
| 2021/0044867 A1* | 2/2021 | Butters | .............. | H04N 21/4302 |

* cited by examiner

TIMESTAMP PROCESSING METHODS FOR STREAMING MEDIA

BACKGROUND OF THE INVENTION

1. Field of the Invention

The present invention generally relates to streaming media, and, more particularly, to the timestamp processing method for streaming media.

2. Description of Related Art

An index file (e.g., a .m3u8 file) or a playlist of streaming media (including but not exclusively HTTP Live Streaming (HLS)) usually contains multiple media segment files. A media segment file can also be referred to as a "chip" (e.g., a .ts file) and contains presentation timestamps (PTSs) (hereinafter referred to as timestamps), which are associated with the playback time or display time and used for providing the user with the time information of the streaming media. However, a timestamp jump (PTS jump, which means the timestamps do not show in the expected order) may sometimes occur in media segment files, causing errors in the display time of the streaming media, or even leading to stuttering playback (i.e., not playing smoothly). Therefore, a good timestamp processing method is needed to address the above-mentioned problems.

SUMMARY OF THE INVENTION

In view of the issues of the prior art, an object of the present invention is to provide a timestamp processing method for streaming media, so as to make an improvement to the prior art.

According to one aspect of the present invention, a timestamp processing method of generating a current output video timestamp and a current output audio timestamp for streaming media is provided. The method includes the steps of: extracting a plurality of video data and a plurality of audio data from a multimedia data; processing the video data to obtain a plurality of video timestamps; processing the audio data to obtain a plurality of audio timestamps; initializing a start timestamp; calculating a first characteristic value and a second characteristic value based on a plurality of target timestamps, wherein the target timestamps are the video timestamps or the audio timestamps; and updating the start timestamp and using the start timestamp as the current output video timestamp or the current output audio timestamp when an absolute difference between the first characteristic value and the second characteristic value is greater than a threshold value.

According to another aspect of the present invention, a timestamp processing method of generating a current output video timestamp and a current output audio timestamp for streaming media is provided. The method includes the steps of: extracting a plurality of video data and a plurality of audio data from a multimedia data; processing the video data to obtain a plurality of video timestamps; processing the audio data to obtain a plurality of audio timestamps; initializing a start timestamp; calculating a first characteristic value and a second characteristic value based on a plurality of target timestamps, wherein the target timestamps are the video timestamps or the audio timestamps; calculating a standard deviation based on the target timestamps and the second characteristic value when an absolute difference between the first characteristic value and the second characteristic value is not greater than a first threshold value; and updating the start timestamp and using the start timestamp as the current output video timestamp or the current output audio timestamp when the absolute difference between the first characteristic value and the second characteristic value is greater than the first threshold value, or when the standard deviation is greater than or equal to a second threshold value.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

Some or all of the processes of the timestamp processing methods for streaming media may be implemented by software and/or firmware and can be performed by the multimedia playback device of the present invention or its equivalent. A person having ordinary skill in the art can choose components or steps equivalent to those described in this specification to carry out the present invention, which means that the scope of this invention is not limited to the embodiments in the specification.

Figure 1:
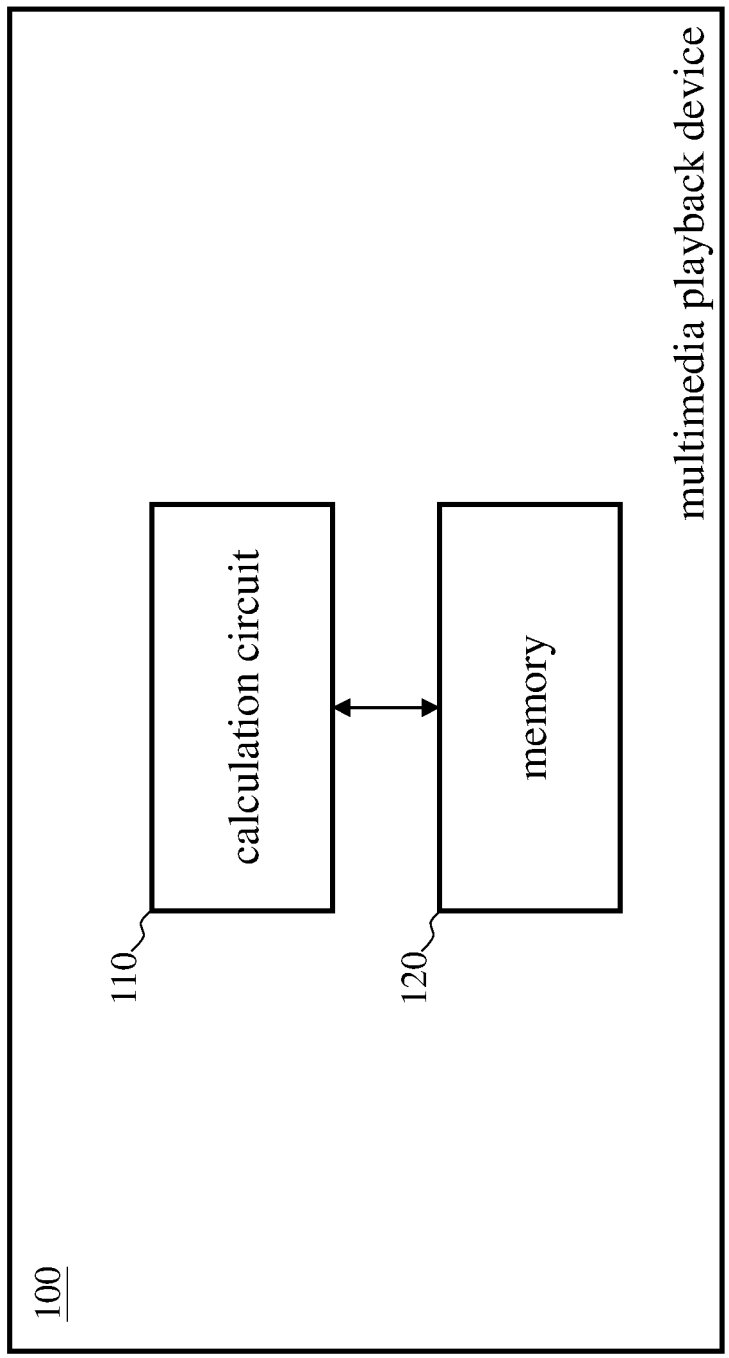
FIG. 1 illustrates a functional block diagram of a multimedia playback device.

FIG. 1 is a functional block diagram of a multimedia playback device according to one embodiment. The multimedia playback device 100 is capable of processing streaming media and includes a calculation circuit 110 and a memory 120. The calculation circuit 110 may be a circuit or an electronic component with program execution capability, such as a central processing unit, a microprocessor, a microprocessing unit, or an equivalent thereof. The calculation circuit 110 executes program codes or program instructions stored in the memory 120 to process the timestamps of the streaming media. The memory 120 can also store media segment files and index files.

Figure 2:
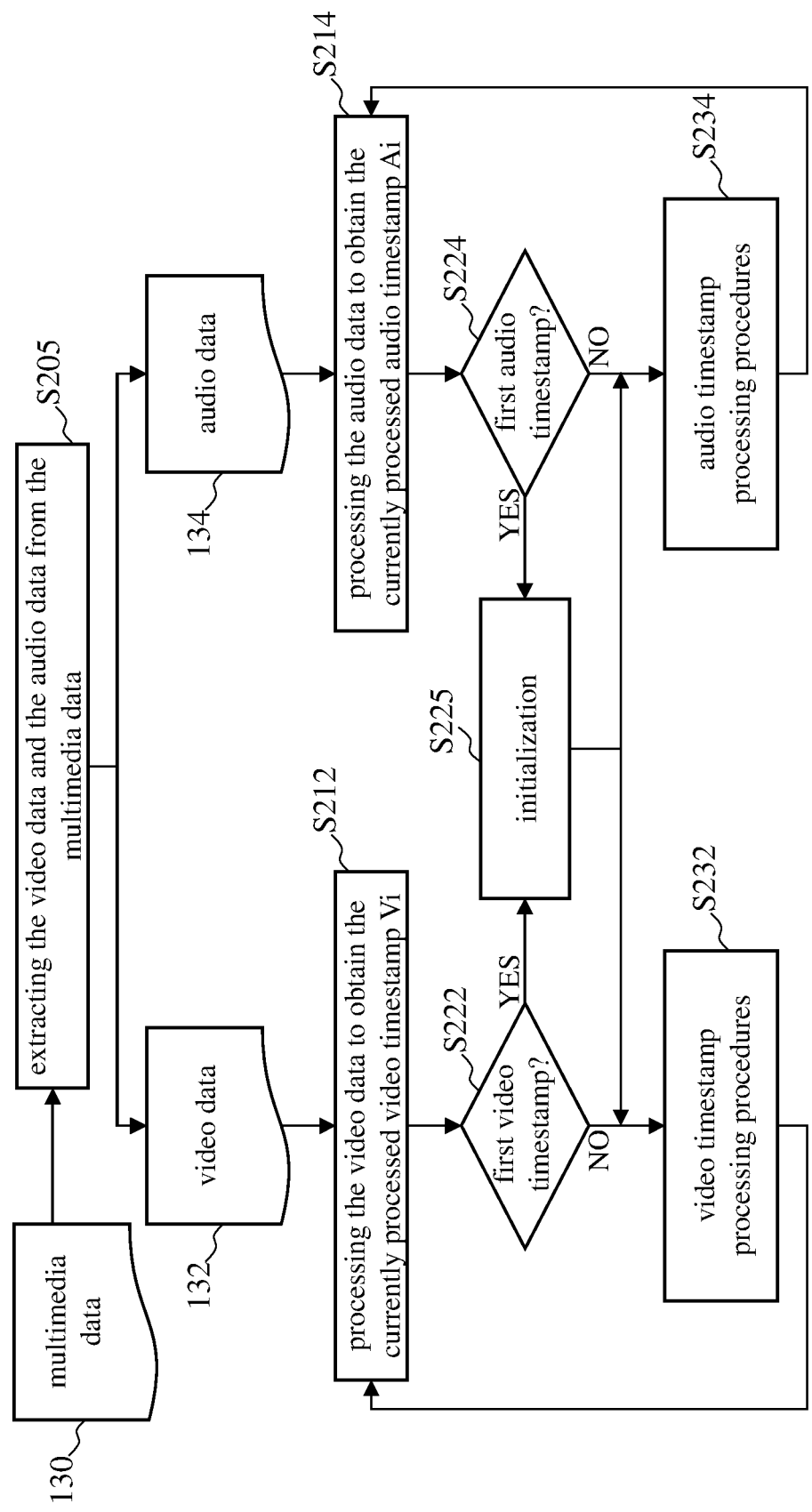
FIG. 2 illustrates a flowchart of a timestamp processing method for streaming media according to an embodiment of the present invention.

FIG. 2 is a flowchart of a timestamp processing method for streaming media according to an embodiment of the present invention. After obtaining the multimedia data 130 which includes multiple media segment files, the calculation circuit 110 extracts the video data 132 and the audio data 134 from the multimedia data 130 (i.e., from the media segment files) (step S205), and processes the video data 132 to obtain the currently processed video timestamp Vi (step S212) as well as processes the audio data 134 to obtain the currently processed audio timestamp Ai (step S214). People having ordinary skill in the art can perform step S205, step S212, and step S214 according to the specifications, so the details of these three steps shall be omitted herein.

Next, the calculation circuit 110 determines whether the latest video timestamp obtained in step S212 (i.e., the currently processed video timestamp Vi) is the first video timestamp (step S222), and determines whether the latest audio timestamp obtained in step S214 (i.e., the currently processed audio timestamp Ai) is the first audio timestamp (step S224). The first video timestamp and the first audio timestamp respectively refer to the earliest generated video timestamp and the earliest generated audio timestamp after the multimedia playback device 100 starts to play the multimedia data 130 (maybe from the beginning or the middle of the multimedia data 130). When the results of step S222 and step S224 are YES, the calculation circuit 110 initializes some parameters used in the timestamp processing method (step S225). When the results of step S222 and step S224 are NO, the calculation circuit 110 generates an output video timestamp based on some or all of the obtained video timestamps (step S232) and generates an output audio timestamp based on some or all of the obtained audio timestamps (step S234). In some embodiments, the calculation circuit 110 performs step S232 and step S234 synchronously. The details of step S225, step S232, and step S234 are discussed below.

Figure 3:
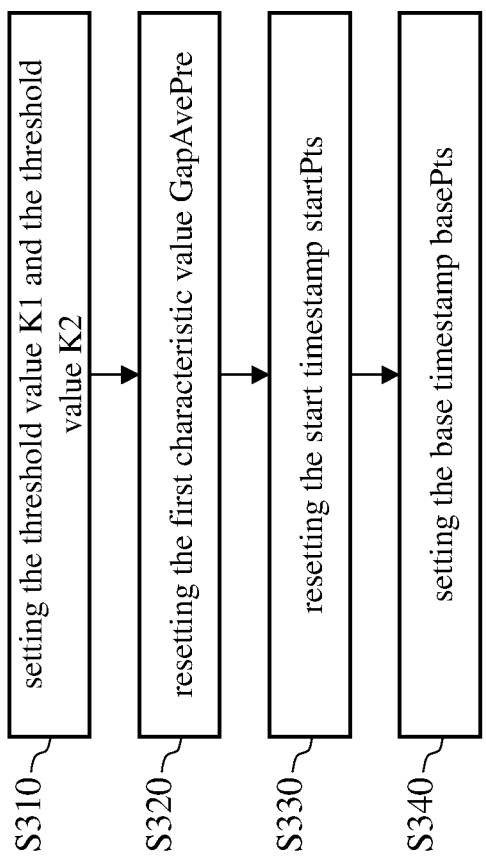
FIG. 3 illustrates a detailed flowchart of the initialization step S225 of FIG. 2.

FIG. 3 is a detailed flowchart of the initialization step S225 of FIG. 2. In the initialization step, the calculation circuit 110 sets the threshold value K1 and the threshold value K2 (step S310), resets the first characteristic value GapAvePre (step S320), resets the start timestamp startPts (step S330), and sets the base timestamp basePts (step S340). In some embodiments, the calculation circuit 110 sets the first characteristic value GapAvePre to zero (step S320), sets the start timestamp startPts to zero (step S330), and sets the base timestamp basePts to the smaller one of the first video timestamp and the first audio timestamp (step S340). The threshold value K1 is a positive integer.

Figure 4:
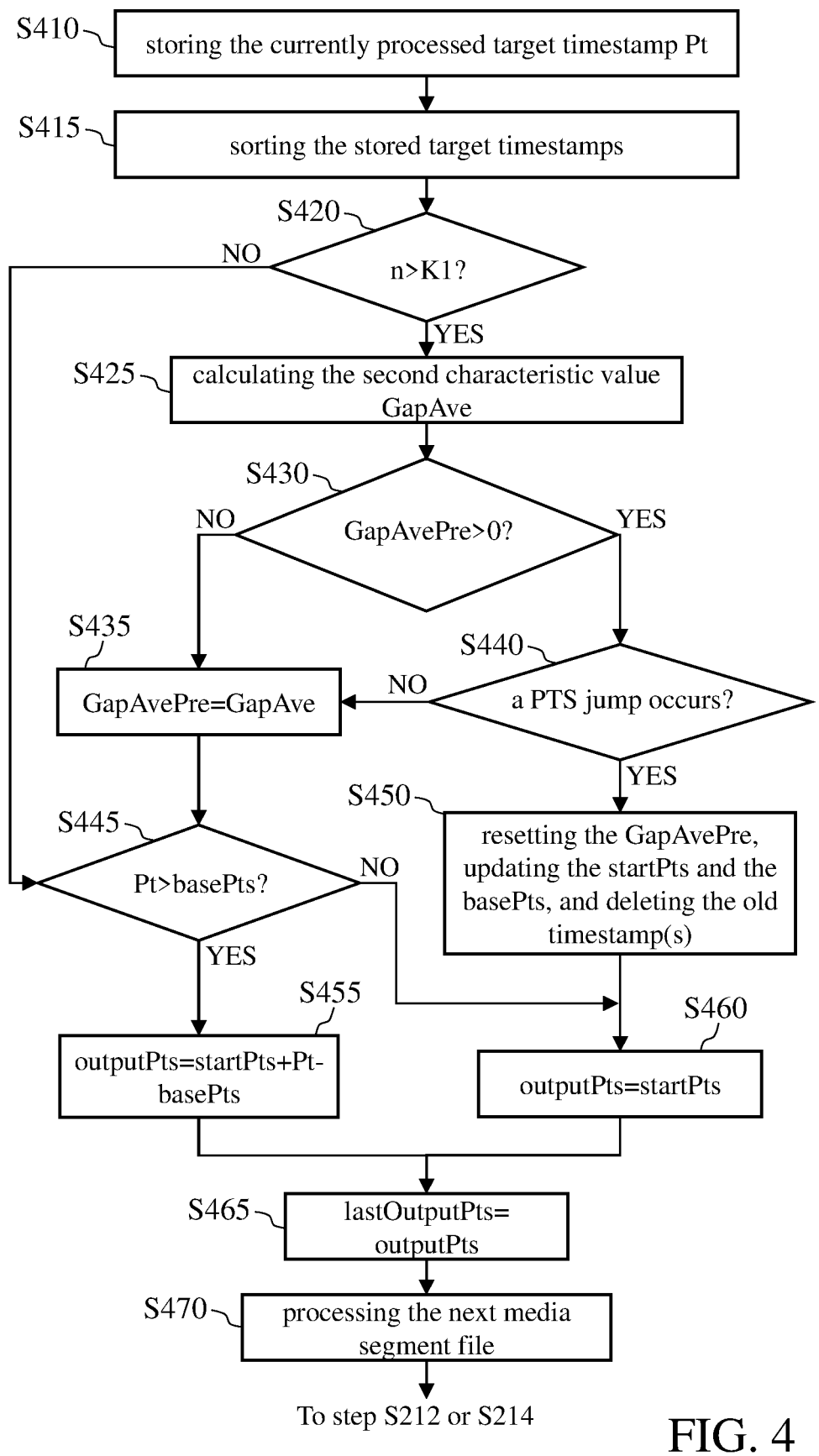
FIG. 4 illustrates a detailed flowchart of the video timestamp processing procedures and the audio timestamp processing procedures of FIG. 2.

FIG. 4 is a detailed flowchart of the video timestamp processing procedures (step S232) and the audio timestamp processing procedures (step S234) of FIG. 2. Because the contents of step S232 are substantially identical to those of step S234 (i.e., FIG. 4 is the detailed flow for both step S232 and step S234), in the following discussion, the target timestamps (PTS$_i$, i=0, 1, 2, . . . , n, n is an integer) are used to represent the video or audio timestamps obtained, the currently processed target timestamp Pt to represent the currently processed video timestamp Vi or the currently processed audio timestamp Ai, the current output target timestamp outputPts to represent the current output video timestamp or the current output audio timestamp, and the preceding output target timestamp lastOutputPts to represent the preceding output video timestamp or the preceding output audio timestamp. The current output target timestamp outputPts immediately follows in time the preceding output target timestamp lastOutputPts; namely, the current output video timestamp immediately follows in time the preceding output video timestamp, and the current output audio timestamp immediately follows in time the preceding output audio timestamp.

Reference is made to FIG. 4. At first, the calculation circuit 110 stores the currently processed target timestamp Pt in the memory 120 (step S410), and then sorts the stored target timestamps (step S415) (e.g., descending or ascending). The reason for sorting is because in steps S212 and S214 the currently processed video timestamp Vi and the currently processed audio timestamp Ai are obtained in the decoding order of the video frames. Then the calculation circuit 110 determines whether the number (n) of the stored target timestamps is greater than the threshold value K1 (step S420). When the result of step S420 is YES, the calculation circuit 110 performs step S425; when the result of step S420 is NO, the calculation circuit 110 performs step S445.

In step S425, the calculation circuit 110 calculates the second characteristic value GapAve based on some or all of the stored target timestamps. In some embodiments, the calculation circuit 110 generate the second characteristic value GapAve by calculating the average value of the differences between adjacent (or contiguous) target timestamps based on equation (1).

$$GapAve = \frac{1}{K1} \sum_{i=n-K1}^{n-1} (PTS_i - PTS_{i-1}) \quad (1)$$

In some embodiments, the threshold value K1 is set to three in step S310; thus, when the number (n) of stored target timestamps is greater than or equal to four, the calculation circuit 110 performs step S425. It should be noted that the threshold value K1 is not limited to three. Please also note that equation (1) corresponds to the stored target timestamps that are sorted in the ascending order (i.e., PTS$_i$>=PTS$_{i-1}$); when the stored target timestamps are sorted in the descending order (i.e., PTS$_{i-1}$>=PTS$_i$), Equation (1) should be modified to equation (1a).

$$GapAve = \frac{1}{K1} \sum_{i=n-K1}^{n-1} (PTS_{i-1} - PTS_i) \quad (1a)$$

Next, the calculation circuit 110 determines whether the first characteristic value GapAvePre is greater than zero (step S430). When the result of step S430 is YES, the calculation circuit 110 performs step S440; when the result of step S430 is NO, the calculation circuit 110 performs step S435.

In step S440, the calculation circuit 110 determines, based on the first characteristic value and the second characteristic value, whether a PTS jump occurs (the details of step S440 will be discussed below). When the PTS jump occurs (YES branch of step S440), the calculation circuit 110 resets the first characteristic value GapAvePre, updates the start timestamp startPts, updates the base timestamp basePts, and deletes the old timestamp(s) in the memory 120 (step S450), and then uses the start timestamp startPts as the current output target timestamp outputPts (step S460) and updates the preceding output target timestamp lastOutputPts by using the current output target timestamp outputPts as the preceding output target timestamp lastOutputPts (step S465).

When the PTS jump does not occur (NO branch of step S440), the calculation circuit 110 updates the first characteristic value GapAvePre by using the second characteristic value GapAve as the first characteristic value GapAvePre (step S435) and then determines whether the currently processed target timestamp Pt is greater than the base timestamp basePts (step S445).

When the result of step S445 is YES, the calculation circuit 110 calculates the current output target timestamp outputPts based on the start timestamp startPts, the currently processed target timestamp Pt, and the base timestamp basePts (i.e., outputPts=startPts+Pt-basePts) (step S455); when the result of step S445 is NO, the calculation circuit 110 performs step S460. After step S465 is finished, the calculation circuit 110 processes the next media segment file (step S470) before returning to step S212 and step S214.

It should be noted that for step S232, the target timestamp mentioned in the flow of FIG. 4 refers to the video timestamp, and for step S234, the target timestamp mentioned in the flow of FIG. 4 refers to the audio timestamp. The start timestamp startPts and the target timestamp outputPts are shared by step S232 and step S234.

Figure 5:
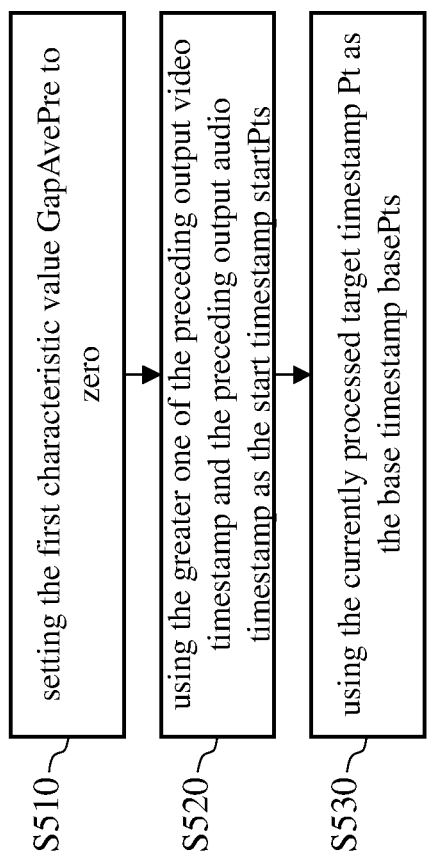
FIG. 5 illustrates a detailed flowchart of step S450 in FIG. 4.

FIG. 5 is a detailed flowchart of step S450 in FIG. 4. In step S450, the calculation circuit 110 sets the first characteristic value GapAvePre to zero (step S510), uses the greater one of the preceding output video timestamp and the preceding output audio timestamp as the start timestamp startPts (step S520), and uses the currently processed target timestamp Pt as the base timestamp basePts (step S530). After the calculation circuit 110 deletes the old timestamp(s) in the memory 120, the only timestamp left in the memory 120 is the currently processed target timestamp Pt. More specifically, after the calculation circuit 110 performs step S450 of step S232, the only timestamp remaining in the memory 120 is the currently processed video timestamp Vi, and after the calculation circuit 110 performs step S450 of step S234, the only timestamp remaining in the memory 120 is the currently processed audio timestamp Ai.

Figure 6:
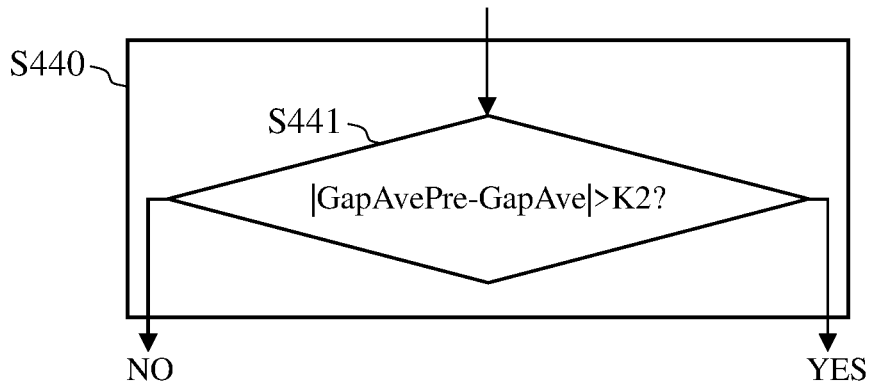
FIG. 6 illustrates a flowchart of step S440 in FIG. 4 according to one embodiment.

FIG. 6 is a flowchart of step S440 in FIG. 4. Step S440 includes step S441: the calculation circuit 110 determines whether the absolute difference between the first characteristic value GapAvePre and the second characteristic value GapAve is greater than the threshold value K2. When the result of step S441 is YES, the calculation circuit 110 determines that the PTS jump has occurred; when the result of step S441 is NO, the calculation circuit 110 determines that no PTS jump has occurred. As for the video timestamp processing procedures (i.e., step S232), in some embodiments, the threshold value K2 can be set to ten times the duration of the video frame, and the duration of the video frame is the reciprocal of the frame rate. As for the audio timestamp processing procedures (i.e., step S234), in some embodiments, the threshold value K2 can be set to 2*2048 times the sample duration, and the sample duration is the reciprocal of the sample rate. It should be noted that the above-mentioned multipliers are not limited to ten and 2*2048. People having ordinary skill in the art can choose various multipliers based on actual operations and/or empirical rules.

Figure 7:
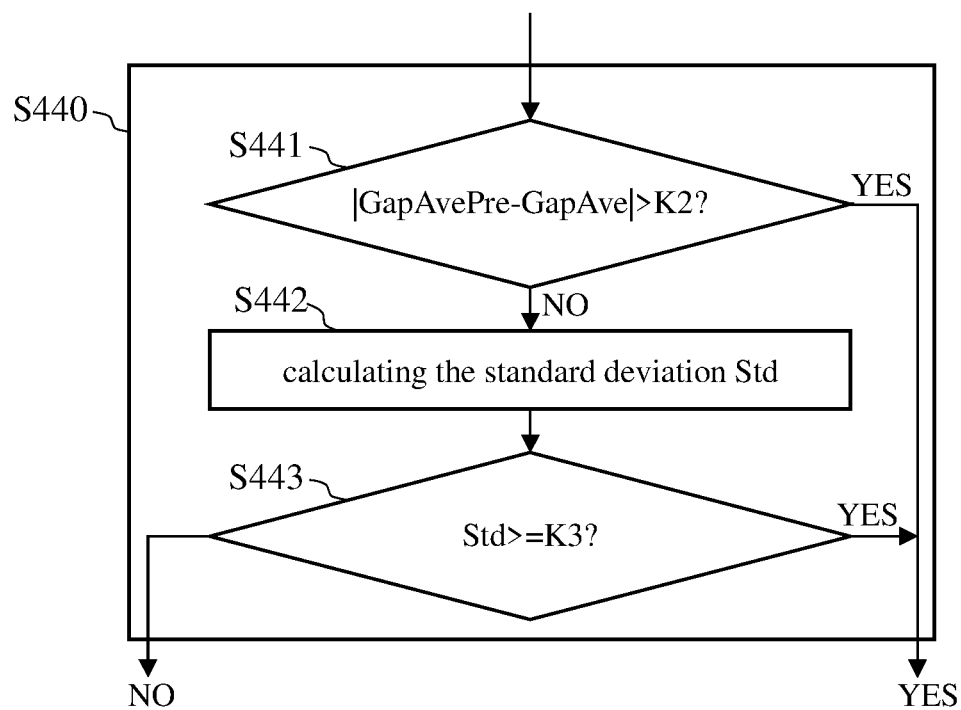
FIG. 7 illustrates a flowchart of step S440 in FIG. 4 according to another embodiment.

FIG. 7 is a flowchart of step S440 in FIG. 4. Step S440 includes step S441, step S442, and step S443. When the result of step S441 is YES, the calculation circuit 110 determines that the PTS jump has occurred; when the result of step S441 is NO, the calculation circuit 110 calculates the standard deviation Std of the differences between adjacent (or contiguous) target timestamps based on equation (2) (which corresponds to equation (1)) or (2a) (which corresponds to equation (1a)) (step S442).

$$Std = \sqrt{\frac{1}{K1} \sum_{i=n-K1}^{n-1} (PTS_i - PTS_{i-1} - GapAve)^2} \quad (2)$$

$$Std = \sqrt{\frac{1}{K1} \sum_{i=n-K1}^{n-1} (PTS_{i-1} - PTS_i - GapAve)^2} \quad (2a)$$

Next, the calculation circuit 110 determines whether the standard deviation Std is greater than or equal to the threshold value K3 (step S443). When the result of step S443 is YES, the calculation circuit 110 determines that the PTS jump has occurred; when the result of step S443 is NO, the calculation circuit 110 determines that no PTS jump has occurred. In some embodiments, the threshold value K3 can be set to one. People having ordinary skill in the art can set the threshold value K3 to other values based on actual operations and/or empirical rules.

In comparison with the method in FIG. 6, the method in FIG. 7 can more accurately determine whether the PTS jump has occurred.

In summary, the present invention analyzes the average and standard deviation of the differences between adjacent timestamps based on the certainty of the video frame rate and audio sample rate to find out abnormal timestamp(s) (i.e., to determine whether this is any PTS jump) and perform exception handling (i.e., steps S450 and S460). After the exception handling, the calculation circuit 110 generates a reasonable current output video timestamp and a reasonable current output audio timestamp. As a result, smooth playback and the display of correct time can be achieved without complex fault-tolerant processing in the subsequent audio and video synchronization processes.

Please note that the shape, size, and ratio of any element and the step sequence of any flowchart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A timestamp processing method of generating a current output video timestamp and a current output audio timestamp for streaming media, comprising:
   extracting a plurality of video data and a plurality of audio data from a multimedia data;
   processing the video data to obtain a plurality of video timestamps;
   processing the audio data to obtain a plurality of audio timestamps;
   initializing a start timestamp;
   calculating a first characteristic value and a second characteristic value based on a plurality of target timestamps, wherein the target timestamps are one of the video timestamps and the audio timestamps; and
   updating the start timestamp and using the start timestamp as one of the current output video timestamp and the current output audio timestamp when an absolute difference between the first characteristic value and the second characteristic value is greater than a threshold value.

2. The method of claim 1, further comprising:
resetting the first characteristic value when the absolute difference between the first characteristic value and the second characteristic value is greater than the threshold value.

3. The method of claim 1, wherein the method further generates a preceding output video timestamp and a preceding output audio timestamp, the current output video timestamp immediately follows in time the preceding output video timestamp, the current output audio timestamp immediately follows in time the preceding output audio timestamp, and the step of updating the start timestamp comprises:
using a greater one of the preceding output video timestamp and the preceding output audio timestamp as the start timestamp.

4. The method of claim 1, further comprising:
using the second characteristic value as the first characteristic value when the absolute difference between the first characteristic value and the second characteristic value is not greater than the threshold value.

5. The method of claim 1, wherein the step of initializing the start timestamp sets the start timestamp to zero.

6. The method of claim 1, wherein the first characteristic value and the second characteristic value are each an average value of differences between adjacent target timestamps.

7. The method of claim 1, wherein the target timestamps comprise a currently processed target timestamp, and the currently processed target timestamp is one of a currently processed video timestamp from the video timestamps and a currently processed audio timestamp from the audio timestamps, the method further comprising:
subtracting a base timestamp from a sum of the start timestamp and the currently processed target timestamp to generate a result and using the result as one of the current output video timestamp and the current output audio timestamp when the absolute difference between the first characteristic value and the second characteristic value is not greater than the threshold value and the currently processed target timestamp is greater than the base timestamp; or using the start timestamp as one of the current output video timestamp and the current output audio timestamp when the absolute difference between the first characteristic value and the second characteristic value is not greater than the threshold value and the currently processed target timestamp is not greater than the base timestamp.

8. The method of claim 7, further comprising:
updating the base timestamp with the currently processed target timestamp when the absolute difference between the first characteristic value and the second characteristic value is greater than the threshold value.

9. The method of claim 7, wherein the video timestamps comprise a first video timestamp, the audio timestamps comprise a first audio timestamp, the first video timestamp is a video timestamp that is earliest generated among the video timestamps, the first audio timestamp is an audio timestamp that is earliest generated among the audio timestamps, the method further comprising:
initializing the base timestamp with a smaller one of the first video timestamp and the first audio timestamp.

10. A timestamp processing method of generating a current output video timestamp and a current output audio timestamp for streaming media, comprising:
extracting a plurality of video data and a plurality of audio data from a multimedia data;
processing the video data to obtain a plurality of video timestamps;
processing the audio data to obtain a plurality of audio timestamps;
initializing a start timestamp;
calculating a first characteristic value and a second characteristic value based on a plurality of target timestamps, wherein the target timestamps are one of the video timestamps and the audio timestamps;
calculating a standard deviation based on the target timestamps and the second characteristic value when an absolute difference between the first characteristic value and the second characteristic value is not greater than a first threshold value; and
updating the start timestamp and using the start timestamp as one of the current output video timestamp and the current output audio timestamp when one of the conditions of the absolute difference between the first characteristic value and the second characteristic value being greater than the first threshold value and the standard deviation being greater than or equal to a second threshold value is met.

11. The method of claim 10, further comprising:
resetting the first characteristic value when one of the conditions of the absolute difference between the first characteristic value and the second characteristic value being greater than the first threshold value and the standard deviation being greater than or equal to the second threshold value is met.

12. The method of claim 10, wherein the method further generates a preceding output video timestamp and a preceding output audio timestamp, the current output video timestamp immediately follows in time the preceding output video timestamp, the current output audio timestamp immediately follows in time the preceding output audio timestamp, and the step of updating the start timestamp comprises:
using a greater one of the preceding output video timestamp and the preceding output audio timestamp as the start timestamp.

13. The method of claim 10, further comprising:
using the second characteristic value as the first characteristic value when the standard deviation is not greater than or equal to the second threshold value.

14. The method of claim 10, wherein the step of initializing the start timestamp sets the start timestamp to zero.

15. The method of claim 10, wherein the first characteristic value and the second characteristic value are each an average value of differences between adjacent target timestamps.

16. The method of claim 10, wherein the target timestamps comprise a currently processed target timestamp, and the currently processed target timestamp is one of a currently processed video timestamp from the video timestamps and a currently processed audio timestamp from the audio timestamps, the method further comprising:
subtracting a base timestamp from a sum of the start timestamp and the currently processed target timestamp to generate a result and using the result as one of the current output video timestamp and the current output audio timestamp when the standard deviation is not greater than or equal to the second threshold value and the currently processed target timestamp is greater than the base timestamp; or using the start timestamp as one of the current output video timestamp and the current output audio timestamp when the standard deviation is not greater than or equal to the second threshold value and the currently processed target timestamp is not greater than the base timestamp.

17. The method of claim 16, further comprising:
updating the base timestamp with the currently processed target timestamp when one of the conditions of the absolute difference between the first characteristic value and the second characteristic value being greater than the first threshold value and the standard deviation being greater than or equal to the second threshold value is met.

18. The method of claim 16, wherein the video timestamps comprise a first video timestamp, the audio timestamps comprise a first audio timestamp, the first video timestamp is a video timestamp that is earliest generated among the video timestamps, the first audio timestamp is an audio timestamp that is earliest generated among the audio timestamps, the method further comprising:
initializing the base timestamp with a smaller one of the first video timestamp and the first audio timestamp.

\* \* \* \* \*